March 21, 1961
E. S. STROMBLAD
2,975,759
HENS' NESTS
Filed June 30, 1958
2 Sheets-Sheet 1
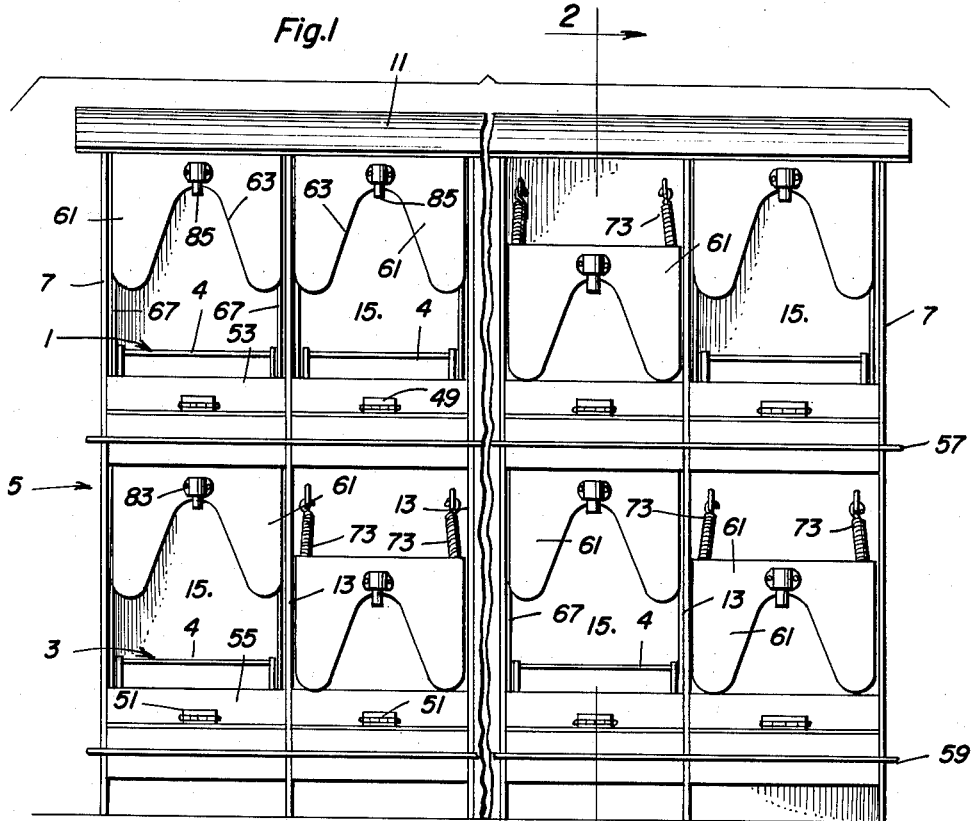
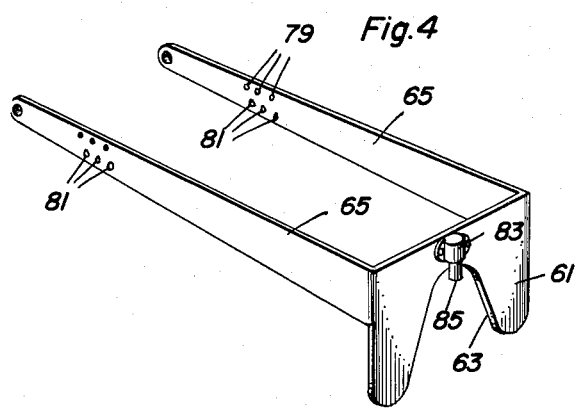
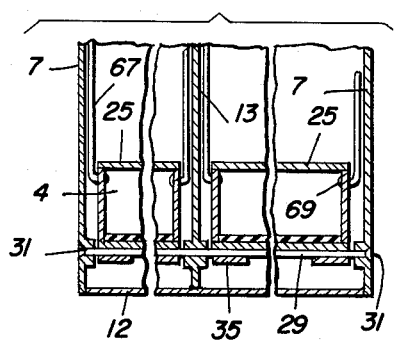
Elmer S. Stromblad
INVENTOR.

March 21, 1961 E. S. STROMBLAD 2,975,759
HENS' NESTS
Filed June 30, 1958 2 Sheets-Sheet 2

Elmer S. Stromblad
INVENTOR.

2,975,759
HENS' NESTS

Elmer S. Stromblad, Box 106, Bigelow, Minn.

Filed June 30, 1958, Ser. No. 745,488

2 Claims. (Cl. 119—50)

This invention relates to improvements in hens' nests for laying hens.

The primary object of the invention is to provide superposed rows of sheltered normally open hens' nests which laying hens may enter at will, together with means operative in response to the weight of hens occupying the nests to block entrance to the occupied nests by other hens, and means for marking hens leaving the nest whereby to visibly indicate which hens of a flock are layers.

Another object is to provide in conjunction with the above, closed egg collection trays forming entrance ledges for the rows of nests and to arrange the nests so that when the hens leave the nests eggs laid thereby will roll out of the nests into the trays into readily accessible position for removal.

Still another object is to accomplish the above by means of simple, inexpensive and practical construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a view in front elevation, partly broken away, of a preferred embodiment of the invention;

Figure 4 is an enlarged view in perspective of a door for blocking entrance of hens to a nest, and parts of mounting means for the door, and Figure 5 is a vertical sectional view, partly broken away, and taken on the line 5—5 of Figure 2.

Figure 2:
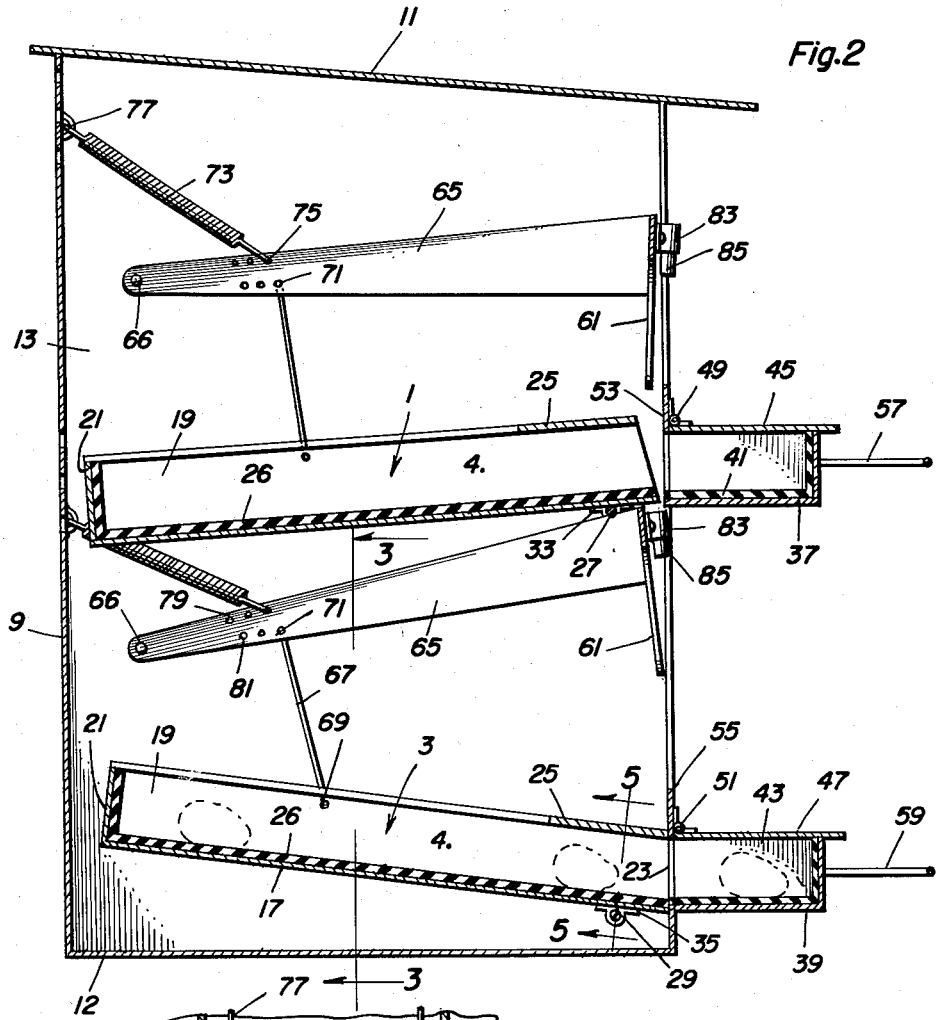
Figure 2 is an enlarged view in vertical transverse section taken on the line 2—2 of Figure 1.

Referring to the drawings by numerals, according to this invention, upper and lower horizontal rows 1, 3 of like nest boxes 4 arranged side by side in each row are provided in an open front housing 5 having side walls 7, a back wall 9, a roof 11, and a bottom 12. The nest boxes 4 are vertically aligned in each row 1, 3 with respect to those in the other row. Vertical partition walls 13 in the housing 5 separate the vertically aligned nest boxes of rows 1, 3 and form with the side walls 7 of the housing 5 open front compartments 15 in the housing 5 each containing a pair of the vertically spaced nest boxes 4.

The nest boxes 4 each comprises a bottom 17, sides 19, a rear closed end 21, an open front end 23, a transverse step panel 25 at its front end suitably fixed on its sides 19, and a cushion liner 26 preferably of rubber to obviate eggs being broken in the nest box 4 when rolled therein in a manner and for a purpose presently described.

A pair of upper and lower horizontal rods 27, 29 extend beneath the front ends 23 of the upper and lower rows 1, 3 of nest boxes 4 and through the partitions 13 with ends suitably fixed in the side walls of the housing 5, as at 31, said rods 27, 29 extending through bearing members, as at 33, 35 on the nest boxes 4 of the upper and lower rows 1, 3 respectively, and whereby the nest boxes 4 are swingably supported at their front ends for tiltably swinging into downwardly and forwardly inclined positions and into upwardly and rearwardly inclined positions for a purpose presently seen.

A pair of upper and lower egg collecting trays 37, 39 open at the tops thereof and rear sides of the same extend horizontally along the front of the housing 5 and are suitably fixed thereto in front of and in communication at their rear sides with the open ends 23 of the nest boxes 4 of the upper and lower rows 1, 3 respectively. When the nest boxes 4 are tilted or swung into downwardly and forwardly inclined position eggs will roll by gravity out of those of the upper and lower rows 1, 3 into the collecting trays 37, 39, as will be clear, for removal to gather the eggs. The trays 37, 39 may be lined, as at 41, 43 like the nest boxes 4 and for the same purpose and are provided with lids 45, 47 respectively, hinged, as at 49, 51, to crossbars 53, 55 suitably fixed to and extending along the front of the housing 5. As will be seen, the trays 37, 39 when the lids 45, 47 are closed form horizontal ledges on which hens may stand to find nest boxes unoccupied and which they may enter.

Upper and lower front roosts 57, 59 on the trays 37, 39 respectively, extend horizontally along said trays for roosting of hens thereon outside the housing 5.

Means is provided for blocking hens from entering the nest boxes 4 when occupied by another hen and comprises the following. Upright door panels 61 associated with the nest boxes 4 respectively, are provided above the open front ends 23 of the associated nest boxes 4 in the front of the compartments 15 containing said boxes 4 and between the walls 7, 13 or 13, 13 of the compartments 15, as the case may be.

The doors 61 are mounted, as presently described, for movement upwardly and downwardly into open and closed positions. In the closed positions thereof, the doors 61 are lowered close to the step panels 25 and trays 37, 39, as the case may be, to block access to said nest boxes 4, whereas, in the open position thereof, said doors 61 are raised above the associated nest boxes 4 sufficiently for hens to pass under the same into said boxes 4.

Vertical, upwardly tapering notches 63 are provided in the doors 61 and which extend upwardly from the bottoms of said doors 61 and serve a purpose presently described.

Figure 3:
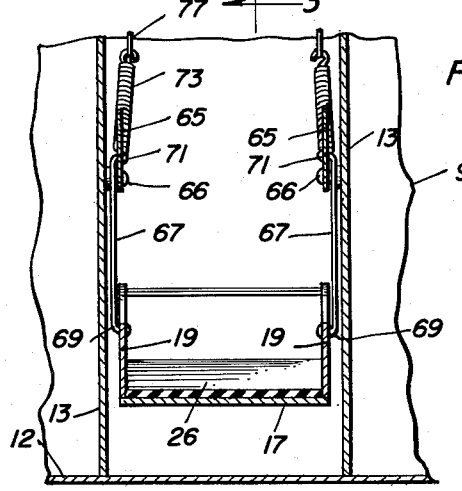
Figure 3 is a fragmentary view in vertical section taken on the line 3—3 of Figure 2.

For mounting purposes, each door 61 is suitably fixed in suspended position to the front ends of a pair of laterally spaced operating rocker arms 65 therefor, one pair of which is shown in Figure 3, and which extend rearwardly in the compartments 15 above and at opposite sides of the associated nest box 4 and are pivoted at the rear ends thereof, as at 66, to the walls 7, 13, or 13, 13 as the case may be at opposite sides of the nest box 4 for swinging movement upwardly and downwardly in unison to correspondingly move the door 61 fixed thereon.

The nest box 4 associated with each door 61 is operatively connected to the pair of operating rocker arms 65 for the door to swing said arms 65 downwardly in response to downward swinging of the nest box 4 by the weight of the hen occupying the nest box, and by means comprising a pair of upright links 67 terminally pivoted to the sides 19 of the nest box 4, as at 69, and to the rocker arms 65, as at 71. A pair of helical tension springs 73 inclining upwardly and rearwardly from the rocker arms 65 and terminally connected thereto, as at 75, and to the rear wall 9 as at 77, normally swing the rocker arms 65 upwardly to open the door 61 and swing the nest box into upwardly and rearwardly inclined position. As will be seen the springs 73 yieldingly sustain the rocker arms 65 and nest boxes 4 in upwardly swung position when the nest boxes 4 are not occupied and yieldingly sustain the nest boxes 4 in downwardly swung position when the nest boxes are occupied. Upward swinging of the nest boxes 4 is limited by the open front ends 23 thereof engaging flush the rear open sides of the trays 37, 39.

A strap metal loop holder 83 for a stick of downwardly projecting chalk 85 is provided on each door 61 at the top of the notch 63 for marking a hen leaving the nest box 4 with which the door 61 is associated, and in a manner to be described.

Longitudinally spaced apertures 79 in the rocker arms 65 provide for varying the pivotal connection of the springs 73 to said arms to vary the tension exerted by said springs and similar apertures 81 are provided in said arms 65 for varying the pivotal connection of the links 67 to said arms, all to compensate for variations in the weights of different sizes of hens so that the nest boxes 4 will always be swung downwardly in proper degree by hens of various weights occupying said nest boxes.

The operation of the described invention will be readily understood. Normally, as shown in Figure 2 in connection with one nest box 4 of the lower row 3, each nest box 4 is swung upwardly into downwardly and forwardly inclined position established in the manner previously described and the door associated with each nest box 4 is moved upwardly into open position by the springs 73 acting on the rocker arms 65 and the arms 65 and links 67 lift the associated nest box 4 upwardly into downwardly and forwardly inclined position. When the door 61 is open a hen may enter the nest box 4 and the nest box 4 will swing downwardly into downwardly and rearwardly inclined position under the weight of the hen therein. In response to such downward swinging of the nest box 4, the associated rocker arms 65 are swung downwardly, in opposition to the connected springs 73, as shown in Figure 2 in connection with one of the nest boxes 4 of the upper row 1, and whereby the door 61 is closed to block or prevent hens from entering the occupied nest box.

As the hen leaves a nest box 4 and walks forwardly therein onto the step 25, the influence of her weight on said nest box gradually diminishes and said box 4 gradually swings upwardly and the door 61 gradually opens so that the hen is forced to stick her neck through the notch 63 in the door before the latter is fully opened and is thus marked by the stick of chalk 85 on the door 61 and is forced to lift the door 61, assisted by the springs 73 and sufficiently to pass out under the door which opens fully under the influence of springs 73 as the hen progresses forwardly of the pivotal axis of the nest box 4. As the door 61 fully opens the associated nest box is returned to normal downwardly and forwardly inclined position in a manner and by means which has already been described and an egg laid in the nest box will gravitate out of the same into the collecting tray 37 or 39 as the case may be.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. In a hen's nest, the combination of a housing having a wall provided with a door opening, a nest box provided in said housing in communication with said door opening, means pivotally mounting the nest box in the housing for depressing movement under the weight of a hen therein, a rocker arm pivotally mounted in the housing above said nest box for raising and lowering movement, means operatively connecting said rocker arm to said nest box whereby the rocker arm is lowered when the nest box is depressed, a door supported by said rocker arm for raising and lowering movement therewith at said door opening, resilient means connected to the rocker arm for urging the same and said door to a raised position and for simultaneously urging the nest box to its undepressed position, said door being provided with a centrally disposed downwardly opening notch permitting a hen in the nest box to project its neck outwardly from the housing when the door is lowered and facilitating passage of the hen through the door opening when the door is raised, and a marker mounted on said door above said notch and projecting downwardly over the notch whereby to mark the neck of a hen leaving said nest box through the door opening.

2. The device as defined in claim 1 together with a loop-shaped marker holder secured to said door above said notch, said marker comprising an elongated marker element of solid material rigidly but removably positioned in said holder.

References Cited in the file of this patent

UNITED STATES PATENTS

| | | |
|---|---|---|
| 1,043,661 | Becker | Nov. 5, 1912 |
| 1,336,802 | Willeford | Apr. 13, 1920 |
| 1,395,078 | Bain | Oct. 25, 1921 |
| 2,022,843 | Busch | Dec. 3, 1935 |
| 2,388,898 | Beam | Nov. 13, 1945 |
| 2,446,208 | Bowers | Aug. 3, 1948 |
| 2,539,052 | Birky | Jan. 23, 1951 |
| 2,692,578 | Manning | Oct. 26, 1954 |